United States Patent [19]

Karasawa

[11] 4,167,302
[45] Sep. 11, 1979

[54] SURGICAL MICROSCOPES WITH L-SHAPED MOUNTING BRACKETS

[75] Inventor: Yukinori Karasawa, Tokyo, Japan

[73] Assignee: Tokyo Kogaku Kikai Kabushiki Kaisha, Japan

[21] Appl. No.: 827,078

[22] Filed: Aug. 23, 1977

[30] Foreign Application Priority Data

Aug. 25, 1976 [JP] Japan .................. 51-113771[U]

[51] Int. Cl.² ............... G02B 21/22; G02B 23/18
[52] U.S. Cl. ............................... 350/36; 350/84; 350/85
[58] Field of Search ............... 350/35, 36, 80–85, 350/257, 39

[56] References Cited

U.S. PATENT DOCUMENTS 3,186,300   6/1965   Littmann .................. 350/36
4,035,057   7/1977   Klein ....................... 350/85

FOREIGN PATENT DOCUMENTS 1547540 10/1968 France ........................ 350/39

Primary Examiner—Jon W. Henry
Attorney, Agent, or Firm—Stevens, Davis, Miller & Mosher

[57]  ABSTRACT

Surgical microscope in which the microscope body is mounted on a support member which is laterally and vertically swingable and slidable along its longitudinal axis. The body comprises an objective lens tube mounted on said support member and having a pair of objective lenses. The objective lens tube can be mounted on said support member at two different positions for accommodating two different types of binocular tubes.

5 Claims, 7 Drawing Figures

SURGICAL MICROSCOPES WITH L-SHAPED MOUNTING BRACKETS

The present invention relates to surgical microscopes.

Generally, surgical microscopes includes a microscope body which is supported by a supporting arm mechanism for a lateral swinging movement, a vertical swinging movement and a focusing movement along the optical axis thereof. Further, in order to provide an ability for stereoscopic observation, such surgical microscopes generally includes a pair of object lens systems which are associated with eye lens systems usually including reflecting optical means for making it possible to observe in a desired direction.

It is also usual to provide beam splitting means in a microscope so that observations are carried out by a plurality of persons. Such observations must be carried out in various attitudes in accordance with the type of surgical operations. Further, it is also required to provide means for photographing or monitoring by television.

For the purposes, conventional surgical microscopes generally comprises an objective lens tube which contains a pair of object lens systems, and generally two pairs of binocular tubes removably mounted on the object lens tube. Each pair of the eye lenses correspond to the pair of object lenses so that two persons can observe the same view simultaneously.

In general surgical operations including the fields of ophthalmology, orthopedics, otothinolaryngology and encephalic surgery, an assistant stands besides an operator and observes the same view as the operator does. Therefore, surgical microscopes applied to the general purpose usually have a main eye lens system for the operator positioned at the front part as well as an auxiliary eye lens system for the assistant positioned at a side part of the microscope. In this type of microscope, the pair of objective lenses are positioned in a side-by-side or laterally aligned relationship as seen from the operator. Complicated reflecting systems are provided for leading light from the objective lenses to the eye lenses for the assistant. An example of such optical system is disclosed by Japanese patent application No. 50-1275 filed on Dec. 28, 1974 and disclosed for public inspection under the disclosure number of Sho No. 51-78352.

However, in case of an operation on a patient's hand, it is recommended that the assistant stands opposite to the operator and observes the same view as the operator does. Thus, a development has been made of a so-called opposed-eyepiece type surgical microscope which has a pair of binocular lenses opposed each against the other. However, this type of surgical microscopes has to be specifically designed only for this purpose but it has been impractical to utilize a conventional design. This is because in such conventional surgical microscopes it is usual to locate a focusing mechanism opposite to the main eye lens for the operator so that an eyepiece having a pair of opposed stereoscopic eye lens systems cannot be used with the objective lens tube of conventional design.

On the other hand, a surgical microscope specifically designed for using such opposed binocular tubes cannot be used with binocular tubes for common surgical operations, because the design of the objective lens system is such that when such common eyepiece is used with this type of microscope the operator and/or the assistant are obliged to take unacceptably unnatural attitudes.

The present invention has therefore an object to provide a surgical microscope which can be used with an eyepiece having a pair of opposed stereoscopic eye lens systems as well as an eyepiece of a conventional design.

Another object of the present invention is to provide a surgical microscope having an objective lens tube which can be positioned in at least two positions so that it can be accommodated to both of the aforementioned two types of eyepieces.

According to the present invention, the above and other objects can be accomplished by a surgical microscope comprising a support member mounted on a frame for lateral swinging movement about a first axis and a vertical swinging movement about a second axis, said support member being movable along a third axis which is parallel with neither of said first and second axes, objective lens tube means having a longitudinal axis and carrying at least a pair of objective lens systems, eyepiece means removably mounted on said objective lens tube means and including at least two pairs of eye lenses, each corresponding to said pair of objective lens systems, means for mounting said objective lens tube means on said support member in at least two alternative positions between which said objective lens tube means is rotated about its longitudinal axis by a predetermined angle. Preferably, said predetermined angle between the two alternative positions is 90° and for the purpose the objective lens tube means is provided with an L-shaped bracket through which the objective lens tube means is mounted on the support member. In one of the alternative positions of the objective lens tube means, it is used with an eyepiece of common design and in the other position it is used with an eyepiece having opposed eye lens systems.

The above and other objects and features of the present invention will become apparent from the following descriptions of a preferred embodiment taking reference to the accompanying drawings, in which.

Figure 1:
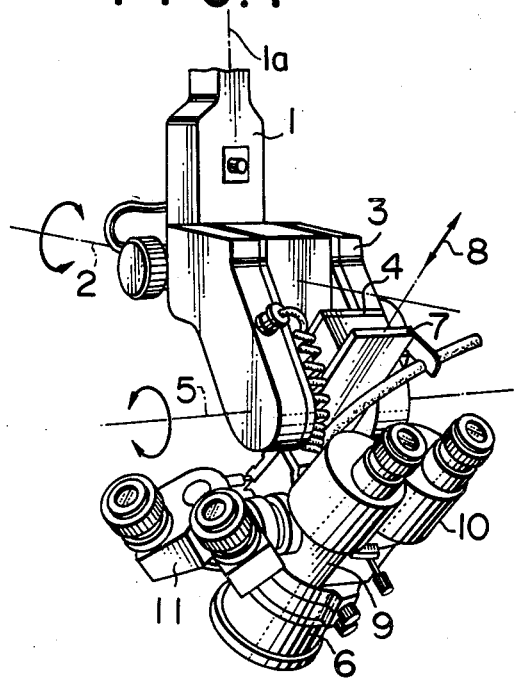
FIG. 1 is a perspective view of a surgical microscope in accordance with one embodiment of the present invention, the microscope being shown in one mode of operation.
Figure 2:
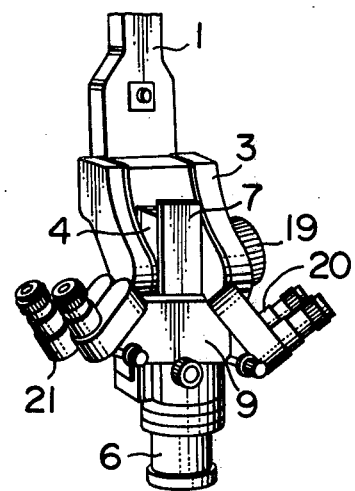
FIG. 2 is a perspective view of the microscope in FIG. 1 but showing the other mode of operation.

Referring now to the drawings, particularly to FIGS. 1 and 2, the microscope shown therein includes a support arm 1 which is mounted on a column (not shown) for swinging movement about a vertical axis 1a. The arm 1 carries a bifurcated bracket 3 which is laterally swingable about a horizontal axis 2. The bifurcated bracket 3 carries a swingable plate 4 for vertical swinging movement about a horizontal lateral axis 5.

On the plate 4, there is disposed a slidable support member 7 which is mounted in a conventional manner for sliding movement along its longitudinal axis 8. An objective lens tube 6 is removably mounted on the support member 7 and binocular tubes 9 is removably fitted to the upper end of the objective lens tube 6. For the purpose, the eyepiece tube 9 has a cylindrical lower portion which is adapted to be snugly fitted to the upper cylindrical bore 6a in the upper end portion of the objective lens tube 6, although not shown in the drawings.

Figure 3:
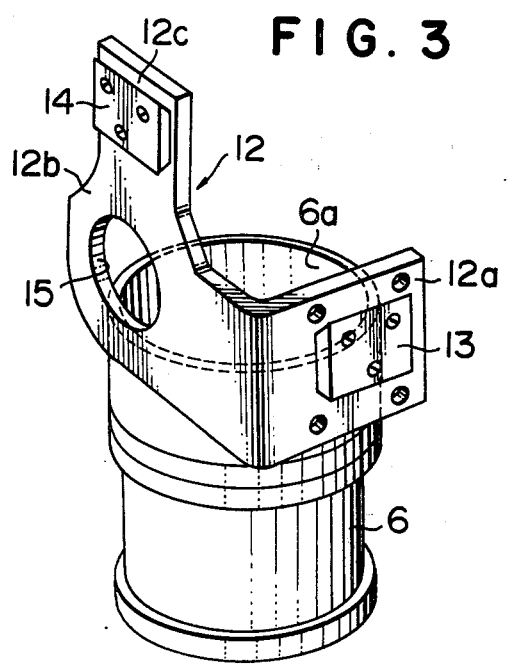
FIG. 3 is a perspective view of the objective lens tube and the mounting bracket.

As shown in FIG. 3, the objective lens tube 6 has an L-shaped bracket 12 which has a leg 12a carrying a fitting 13 of dove-tail cross-section. The other leg 12b of the bracket 12 has an upward extension 12c which is provided with a fitting 14 of dove-tail cross-section.

Figure 4:
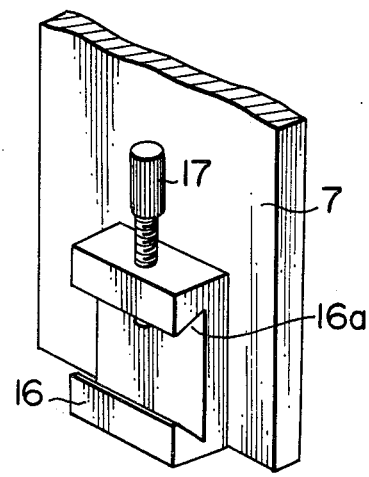
FIG. 4 is a perspective view of the support member.
Figure 5:
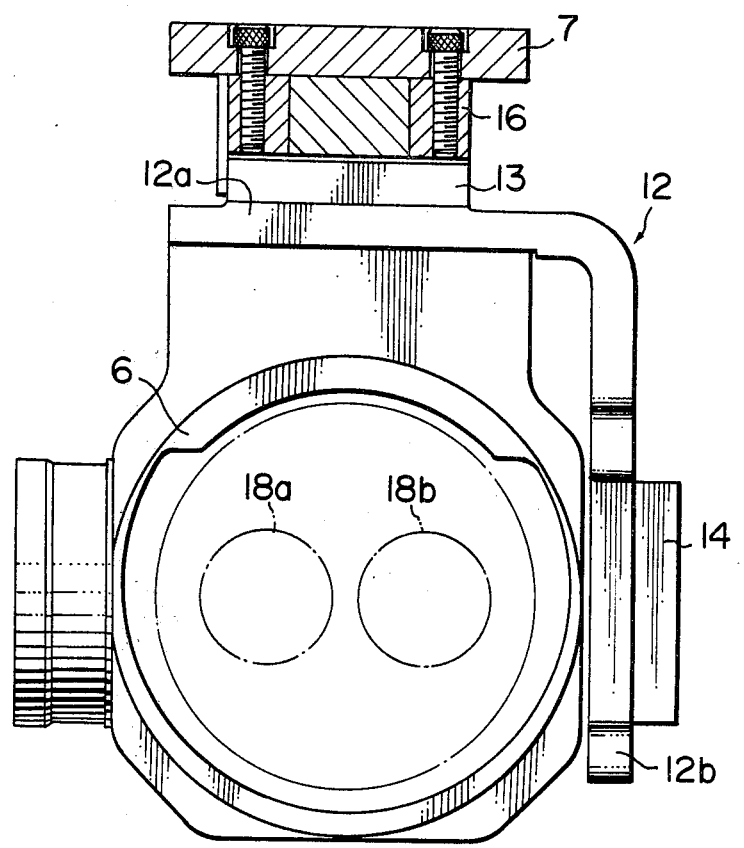
FIG. 5 is a plan view showing the installation of the objective lens tube.

The support member 7 has a fitting 16 which has a laterally extending dove-tail groove 16a of such cross-section that is complementary to the fittings 13 and 14. The fitting 16 further has a retaining screw 17 as shown in FIG. 4. Thus, the objective lens tube 6 can be mounted on the support member 7 in either of two different positions by engaging either of the fittings 13 and 14 with the groove 16a of the fitting 16 on the support member 7. FIG. 5 shows the position of the objective lens tube 6 where the fitting 13 is engaged with the groove 16a.

The objective lens tube 6 carries a pair of objective lenses 18a and 18b which are transversely aligned with respect to each other in the position of the objective lens tube 6 shown in FIG. 5. The position of the objective lens tube 6 is suitable for use with the binocular tubes 9 of the type shown in FIG. 1. This type of binocular tubes 9 has a main stereoscopic eyepiece 10 for the main operator and an auxiliary eyepiece 11 for the assistant.

Figure 6:
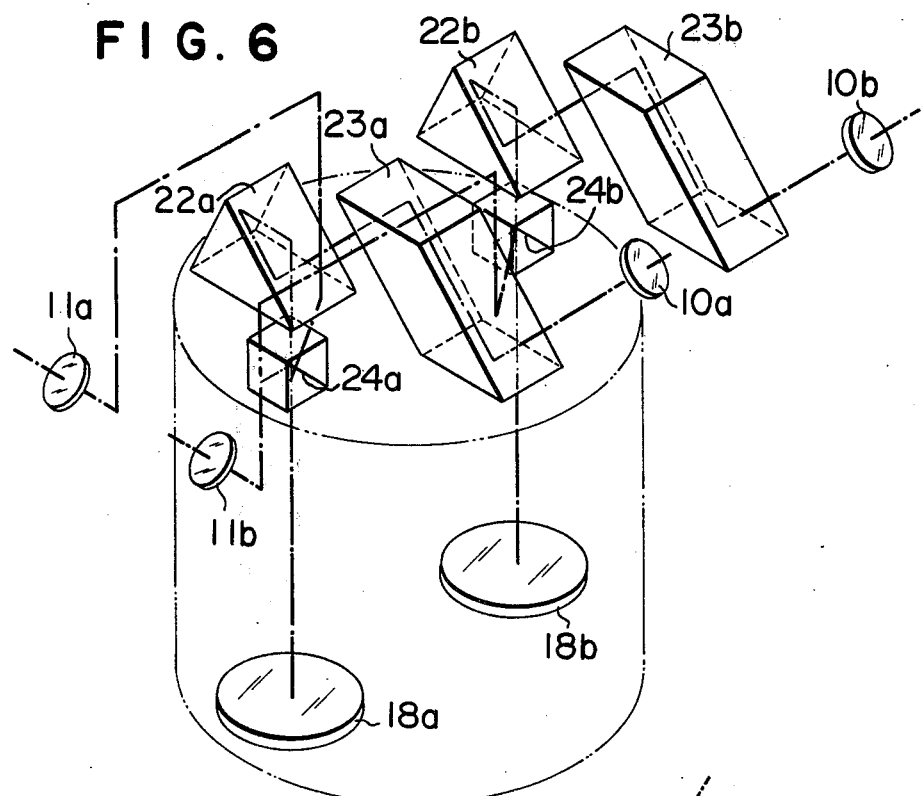
FIG. 6 is a diagrammatical perspective view showing the optical system of the binocular tubes shown in FIG. 1.
Figure 7:
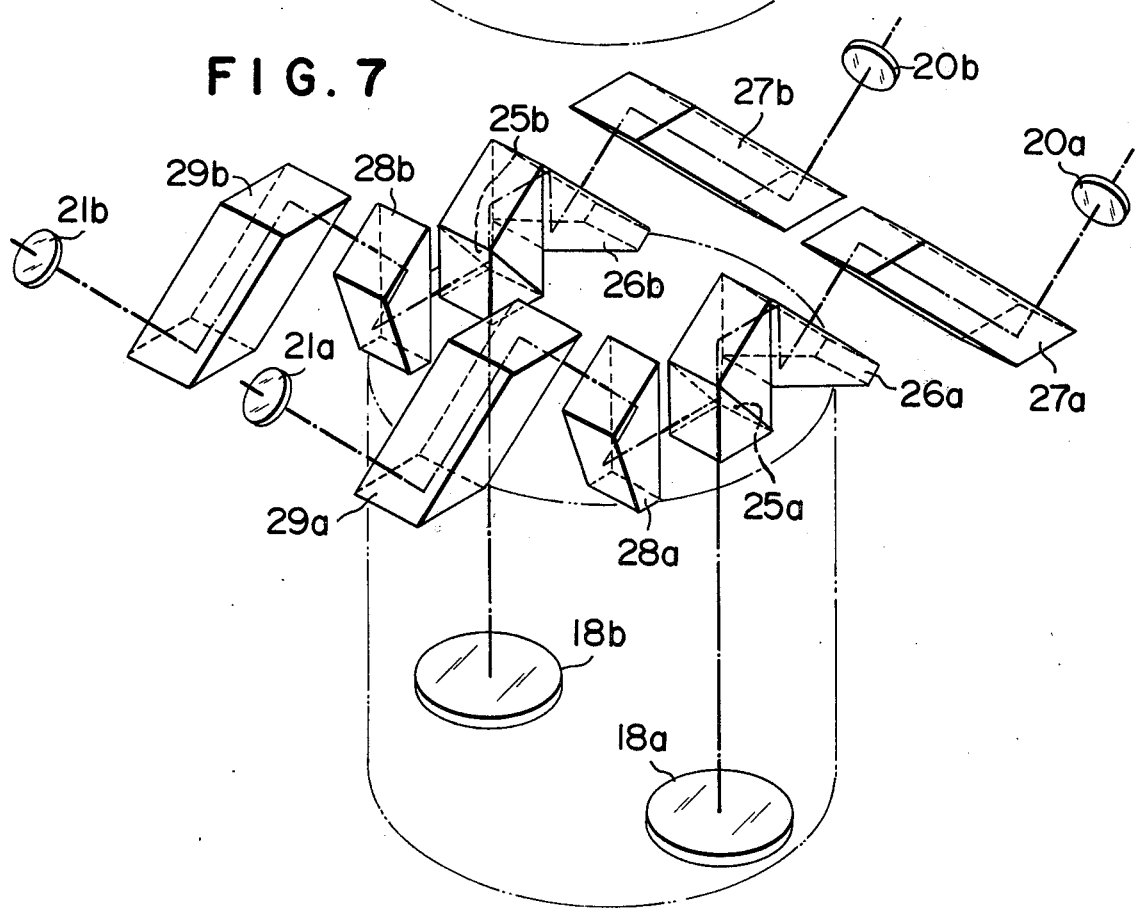
FIG. 7 is a view similar to FIG. 6 but showing the optical system of the binocular tubes shown in FIG. 2.

As shown in FIG. 6, the light which has passed through the objective lens 18a is reflected by prisms 22a and 23a and led into the eye lens 10a of the main eyepiece 10. Similarly, the light which has passed through the objective lens 18b is reflected by prisms 22b and 23b and led to the eye lens 10b. The light from the objective lenses 18a and 18b are also partly reflected by beam splitters 24a and 24b before entering the prisms 22a and 22b so as to be led to the eye lenses 11a and 11b. Reflecting optical systems for directing the light beams reflected by the beam splitters 24a and 24b are disclosed by the aforementioned Japanese patent application, so that reference is made to Japanese patent disclosure No. 51-78352 for detail.

In the position of the objective lens tube 6 shown in FIG. 5, it is inconvenient to use an opposed eyepiece type eyepiece tube 9 as shown in FIG. 2 because the eye lenses in each pair must be located along a line perpendicular to the line along which the paired objective lenses 18a and 18b are located.

According to the feature of the invention, the objective lens tube 6 is therefore rotated for 90° by bringing the fitting 14 on the bracket 12 into engagement with the groove 16a in the fitting 16. In this position of the objective lens tube 6, the light from the lens 18a is in part reflected by the incident surface 25a of a prism 26a and the remaining part of the light is passed through the prism 26a into a second prism 27a from which the light is passed into the eye lens 20a of the eyepiece 20. The light which has been reflected by the prism surface 25a is directed through prisms 28a and 29a to the eye lens 21a of the eyepiece 21. Similarly, the light from the objective lens 18b is directed on one hand through prisms 26b and 27b to the eye lens 20b and on the other hand through prisms 28b and 29b to the eye lens 21b.

The microscope is provided with a focusing system which is adapted to move the support member 7 for focusing along its longitudinal axis 8 through a mechanism not shown but conventional in the art. The bracket 12 may be formed at its leg 12b with an opening 15 which may be utilized for providing further optical paths for other accessories.

The invention has thus been shown and described with reference to a preferable embodiment, however, it should be noted that the invention is in no way limited to the details of the illustrated structures but changes and modifications may be made without departing from the scope of the appended claims. For example, the lateral swing axis 2 is shown as extending horizontally, however, it may be inclined as desired. In fact, there are several applications wherein the lateral swing axis is preferably inclined by about 45°. The mounting bracket 12 is shown as being of a one-piece construction, however, it may be divided into one or more parts.

I claim:

1. A surgical microscope comprising a support member mounted on a frame for lateral swinging movement about a first axis and a vertical swinging movement about a second axis, said support member being movable along a third axis which is parallel with neither of said first and second axes, objective lens tube means having a longitudinal axis and carrying at least a pair of objective lens systems, binocular tubes removably mounted on said objective lens tube means and including at least two pairs of eye lenses, each corresponding to said pair of objective lens systems, means for mounting said objective lens tube means on said support member in at least two alternative positions between which said objective lens tube means is rotated about its longitudinal axis by a predetermined angle, said mounting means including a generally L-shaped mounting bracket having first and second legs which are alternatively attached to the objective lens tube, means on said first and second legs for alternately attaching said legs to said support member.

2. A surgical microscope in accordance with claim 1 in which said predetermined angle is 90°.

3. A surgical microscope in accordance with claim 1 in which said leg attaching means includes a fitting of dove-tail cross-section on each of the legs and a fitting on the support member which has a groove of dove-tail cross-section for receiving the fitting on either of said legs.

4. A surgical microscope in accordance with claim 1 in which said mounting bracket is of one-piece construction.

5. A surgical microscope in accordance with claim 1 in which one of the legs has opening means for providing optical path for at least one further accessory.

* * * * *